(12) United States Patent
S V

(10) Patent No.: US 9,547,364 B2
(45) Date of Patent: Jan. 17, 2017

(54) METHOD AND APPARATUSES FOR DETERMINING A USER ATTENTION LEVEL USING FACIAL ORIENTATION DETECTION

(75) Inventor: Basavaraja S V, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 198 days.

(21) Appl. No.: 14/233,803

(22) PCT Filed: Jul. 24, 2012

(86) PCT No.: PCT/FI2012/050747
§ 371 (c)(1),
(2), (4) Date: Apr. 10, 2014

(87) PCT Pub. No.: WO2013/017732
PCT Pub. Date: Feb. 7, 2013

(65) Prior Publication Data
US 2014/0375549 A1    Dec. 25, 2014

(30) Foreign Application Priority Data

Jul. 29, 2011  (IN) ........................... 2623/CHE/2011

(51) Int. Cl.
*G06F 3/01* (2006.01)
*G06F 1/32* (2006.01)
*G06F 21/31* (2013.01)
*H04M 1/67* (2006.01)
*H04W 52/02* (2009.01)

(52) U.S. Cl.
CPC ............ *G06F 3/012* (2013.01); *G06F 1/3203* (2013.01); *G06F 21/31* (2013.01); *H04M 1/67* (2013.01); *H04W 52/0254* (2013.01); *G06F 2221/2137* (2013.01); *H04M 2250/52* (2013.01); *H04W 52/0267* (2013.01)

(58) Field of Classification Search
CPC combination set(s) only.
See application file for complete search history.

(56) References Cited

U.S. PATENT DOCUMENTS

| | | | |
|---|---|---|---|
| 5,167,024 A | 11/1992 | Smith et al. |
| 5,428,790 A | 6/1995 | Harper et al. |
| 5,504,908 A | 4/1996 | Ikeda |
| 2004/0175020 A1 | 9/2004 | Bradski et al. |
| 2009/0092293 A1 | 4/2009 | Lin |
| 2009/0175509 A1 | 7/2009 | Gonion et al. |
| 2010/0039376 A1 | 2/2010 | Wang |

OTHER PUBLICATIONS

Ma et al., "A Generic Framework of User Attention Model and Its Application in Video Summarization", IEEE Transactions on Multimedia, vol. 7, No. 5, Oct. 2005, pp. 907-919.

(Continued)

*Primary Examiner* — Van Chow
(74) *Attorney, Agent, or Firm* — Alston & Bird LLP

(57) ABSTRACT

Various methods are provided for facilitating the determination of a user attention level using facial orientation detection. One example method may include receiving an image of a user after an expiration of an inactivity timer on the user terminal. The current attention level of the user is determined based on the received image. The computing device lock condition is then set based on the determined current attention level of the user. Similar and related example apparatuses and example computer program products are also provided.

20 Claims, 4 Drawing Sheets

(56) References Cited

OTHER PUBLICATIONS

Viola et al., "Rapid Object Detection Using a Boosted Cascade of Simple Features", Proceedings of the 2001 IEEE Computer Society Conference on Computer Vision and Pattern Recognition, vol. 1, 2001, pp. 1-9.
Xiao et al., "Robust Multipose Face Detection in Images", IEEE Transactions on Circuits and Systems for Video Technology, vol. 14, No. 1, Jan. 2004, pp. 31-41.
Extended European Search Report received for corresponding European Patent Application No. 12819689.6, dated Mar. 12, 2015, 7 pages.
International Search Report and Written Opinion received for corresponding Patent Cooperation Treaty Application No. PCT/FI2012/050747, dated Dec. 27, 2012, 15 pages.
Office Action for European Patent Application No. 12 819 689.6 dated Apr. 4, 2016, 5 pages.

METHOD AND APPARATUSES FOR DETERMINING A USER ATTENTION LEVEL USING FACIAL ORIENTATION DETECTION

RELATED APPLICATION

This application was originally filed as Patent Cooperation Treaty Application No. PCT/FI2012/050747, filed Jul. 24, 2012 which claims priority benefit to Indian Patent Application No. 2623/CHE/2011, filed Jul. 29, 2011.

TECHNOLOGICAL FIELD

Embodiments of the present invention relate generally to user attention detection technology and, more particularly, relate to a method, apparatus, and computer program product for facilitating the determination of a user attention level using facial orientation detection.

BACKGROUND

Generally mobile devices have battery life limitations. In order to address the battery life limitation most mobile devices include an inactivity timer that locks a display of the mobile device and/or causes the mobile device to enter a sleep mode after a period of inactivity.

However, with the expanded usage of and the expanded number of available applications available on the mobile device, the definition of inactivity has changed. For example, in the past, inactivity was easier to detect as it was any time that a user was not physically interacting with the buttons of the mobile device, the user was actively using the phone and/or the phone was executing a process. Conversely, in present times a mobile device may be configured to display a feature length movie, a book on tape, driving directions and/or the like. In these situations a user may not physically interact with the device for long periods of time. Even though the user is not physically interacting with the device, the user may still be paying attention to the device and thus does not want the device to lock. Conversely even though a movie is currently playing, the user may no longer be paying attention and the device may be draining its battery. Currently mobile devices cannot determine are only configured to automatically enter a sleep mode by using the inactivity timer.

BRIEF SUMMARY

Methods, apparatuses, and computer program products are herein provided for facilitating the determination of a user attention level using facial orientation detection. Systems, methods, apparatuses, and computer program products in accordance with various embodiments may provide several advantages to computing devices and computing device users. For example, the determination of a user attention level using facial orientation detection may permit a mobile device to determine that a user is actively using the device, even in the absence of user input, so as to avoid locking of the device during use.

One example method may include receiving an image of a user after an expiration of an inactivity timer on the user terminal. The current attention level of the user may then be determined based on the received image. The computing device lock condition may then be set based on the determined current attention level of the user. Similar and related example apparatuses and example computer program products are also provided.

An additional example embodiment is an apparatus configured to implement face detection and facial orientation detection. The example apparatus may comprise at least one processor and at least one memory including computer program code with the at least one memory and the computer program code configured to, with the at least one processor, direct the apparatus to perform various functionality. In this regard, the example apparatus may be directed to receive an image of a user, wherein the image is captured after a duration of inactivity. In this regard, the example apparatus may be configured to determine a current attention level of the user based on the received image. The example apparatus may further cause a lock condition to be set based on the determined current attention level of the user.

Another example embodiment is a computer program that, when executed causes an apparatus to determine a current level of user attention. The example computer product may include at least one computer readable non-transitory memory medium having program code stored thereon, the program code which when executed by an apparatus cause the apparatus to perform various functionality. In this regard, the example computer program product may be configured to cause the apparatus at least to receive an image of a user, wherein the image is captured after a duration of inactivity with the apparatus. In this regard, the example computer program product may be further configured to determine the current attention level of the user based on the received image. The example computer program product may be further configured to cause a lock condition of the apparatus to be set based on the determined current attention level of the user.

A further example embodiment is an apparatus configured to implement face detection and facial orientation detection. The example apparatus may include means for receiving an image of a user captured after a duration of inactivity with the apparatus. The apparatus may further include means for determining a current attention level of the user based on the received image. The apparatus may further still include means for causing a lock condition of the apparatus to be set based on the determined current attention level of the user.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
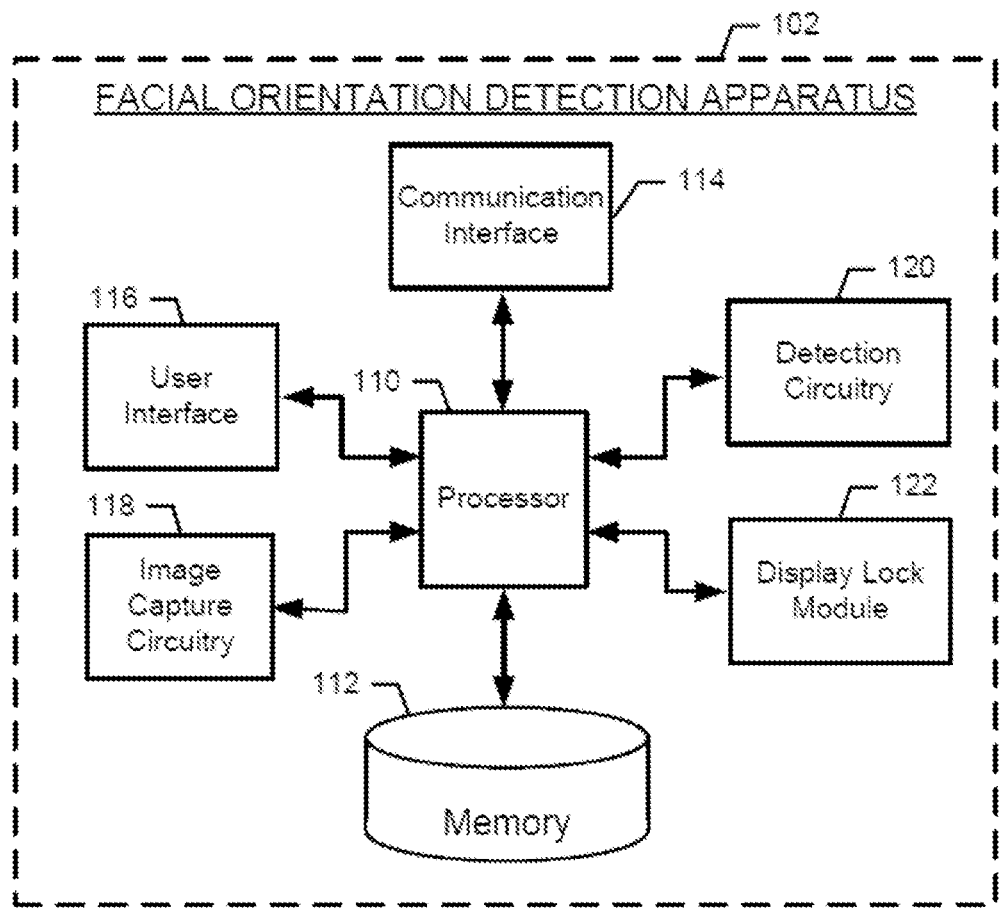
FIG. 1 illustrates a block diagram of a facial orientation detection apparatus for performing face detection and facial orientation detection according to an example embodiment of the present invention.

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

In an example embodiment, a mobile device may be configured to lock or enter into sleep mode after a period and/or duration of inactivity. However, in some cases, even though a user has not physically interacted with the device, the user still may be passively interacting with the device. For example, a user may be reading a long message or watching a movie. Such actions, while lacking physical interaction with the device, still involve user interaction and result in a diminished user experience when the device locks prematurely.

Various example embodiments operate to control the locking of a display based on a current attention level of a user that is determined based on a captured image of the user. As described herein an image may be a photograph, an image captured by a camera, a series of images, a video, a representation of the foregoing and/or the like. As such, example embodiments may be implemented on any device configured to lock and/or place a device in sleep mode after a period of inactivity by the user, including mobile devices, computing devices, displays and/or the like. The devices may further include devices that are fixed or relatively fixed, such as personal computers, televisions, gaming systems, computer workstations or the like. The term device is user interchangeably with the term user terminal throughout this disclosure.

According to various example embodiments, a facial orientation detection unit of a device may activate after a set duration of inactivity. The facial orientation detection unit is configured to determine the attention level of a user by detecting his/her facial orientation with respect to the device, camera and/or other media capture device. Analysis of a captured image further enables a determination of, for example, a user's attention level with regard to the device. Therefore, embodiments of the present invention enable the device to optionally determine if the display should be locked based upon the user's attention level.

FIG. 1 illustrates a block diagram of a facial orientation detection apparatus 102 for performing facial orientation detection according to an example embodiment of the present invention. It will be appreciated that the facial orientation detection apparatus 102 is provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for performing face detection other configurations may also be used to implement embodiments of the present invention.

The facial orientation detection apparatus 102 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, positioning device, any combination thereof, and/or the like. In an example embodiment, the facial orientation detection apparatus 102 is embodied as a mobile terminal, such as that illustrated in FIG. 2. Additionally, or alternatively the facial orientation detection apparatus may be embodied as a remote server, remote network node and/or the like remote from the mobile terminal, such as that illustrated in FIG. 3.

Figure 2:
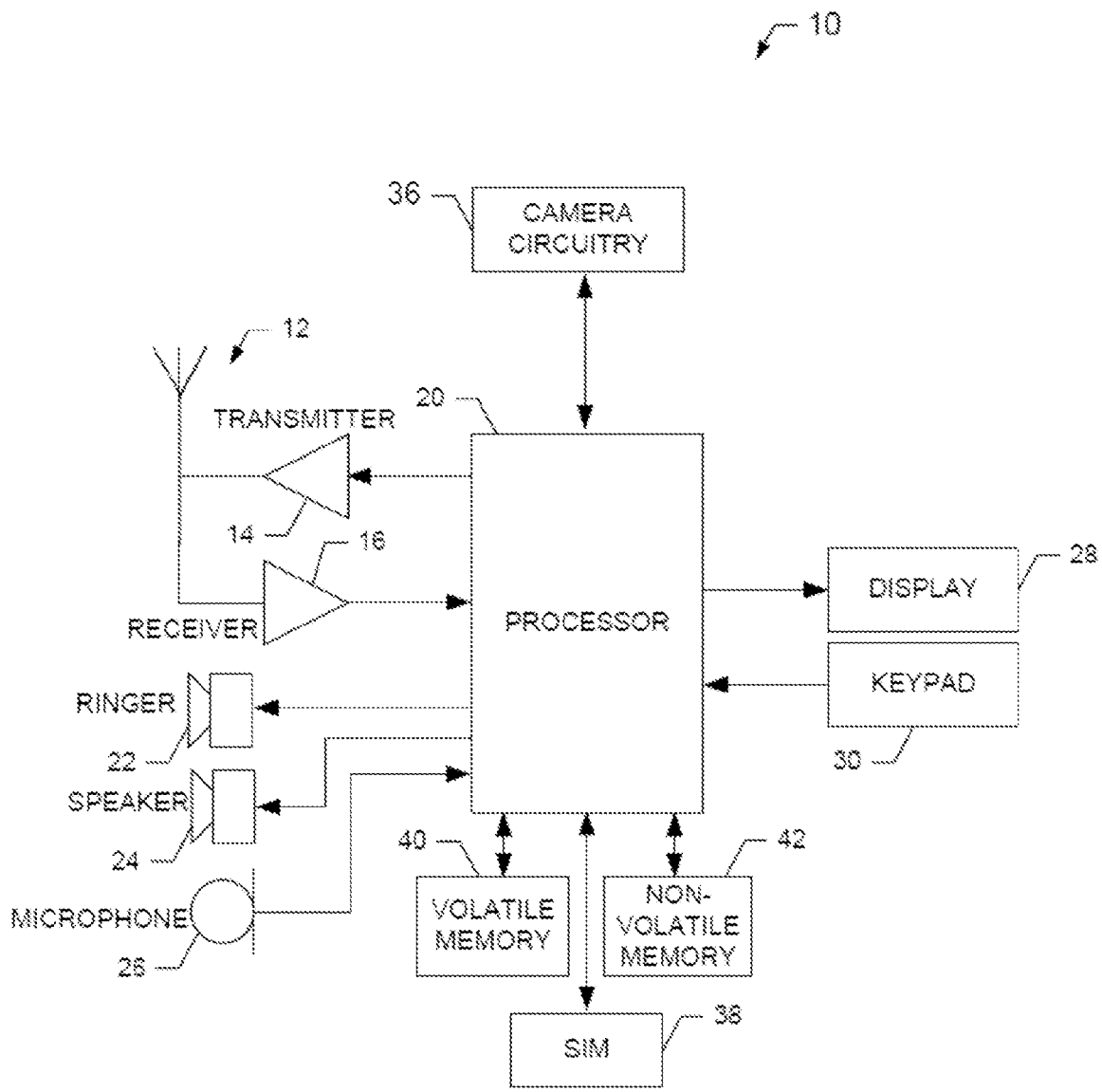
FIG. 2 is a schematic block diagram of a mobile terminal according to an example embodiment of the present invention.

In this regard, FIG. 2 illustrates a block diagram of a mobile terminal 10 representative of one embodiment of a facial orientation detection apparatus 102. It should be understood, however, that the mobile terminal 10 illustrated and hereinafter described is merely illustrative of one type of facial orientation detection apparatus 102 that may implement and/or benefit from embodiments of the present invention and, therefore, should not be taken to limit the scope of the present invention. While several embodiments of the user terminal (e.g., mobile terminal 10) are illustrated and will be hereinafter described for purposes of example, other types of user terminals, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal 10 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal 10 may be allocated between these devices according to their respective capabilities. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

The mobile terminal 10 may include a media capturing element, such as a camera, video and/or audio module, in communication with the processor 20. The media capturing element may comprise any means for capturing an image, video and/or audio for storage, display or transmission. For example, in an example embodiment in which the media capturing element comprises camera circuitry 36, the camera circuitry 36 may include a digital camera configured to form a digital image file from a captured image. In addition, the digital camera of the camera circuitry 36 may be configured to capture a video clip. As such, the camera circuitry 36 may include all hardware, such as a lens or other optical component(s), and software necessary for creating a digital image file from a captured image as well as a digital video file from a captured video clip. Alternatively, the camera circuitry 36 may include only the hardware needed to view an image, while a memory device of the mobile terminal 10 stores instructions for execution by the processor 20 in the form of software necessary to create a digital image file from a captured image. As yet another alternative, an object or objects within a field of view of the camera circuitry 36 may be displayed on the display 28 of the mobile terminal 10 to illustrate a view of an image currently displayed which may be captured if desired by the user. As such, a captured image may, for example, comprise an image captured by the camera circuitry 36 and stored in an image file. As another example, a captured image may comprise an object or objects currently displayed by a display or viewfinder of the mobile terminal 10, but not necessarily stored in an image file. In an example embodiment, the camera circuitry 36 may further include a processing element such as a co-processor configured to assist the processor 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include other non-transitory memory, such as volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the facial orientation detection apparatus 102 includes various means for performing the various functions herein described. These means may comprise one or more of a processor 110, memory 112, communication interface 114, user interface 116, image capture circuitry 118, detection circuitry 120, and/or display lock 122. The means of the facial orientation detection apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the facial orientation detection apparatus 102 as described herein. The plurality of processors may be embodied on a single computing device or distributed across a plurality of computing devices collectively configured to function as the face detection apparatus 102. In embodiments wherein the facial orientation detection apparatus 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the facial orientation detection apparatus 102 to perform one or more of the functionalities of the facial orientation detection apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, non-transitory memory, such as volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the face detection apparatus 102. In various example embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the facial orientation detection apparatus 102 is embodied as a mobile terminal 10, the memory 112 may comprise the volatile memory 40 and/or the non-volatile memory 42. The memory 112 may be configured to store information, data, applications, instructions, or the like for enabling the facial orientation detection apparatus 102 to carry out various functions in accordance with various example embodiments. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The stored information may include, for example, models used for face detection, images, videos, video frames, and/or the like. This stored information may be stored and/or used by the image capture circuitry 118 and/or detection circuitry 120 during the course of performing their functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data to/from another computing device. For example, the communication interface 114 may be configured to receive data representing an image over a network. In this regard, in embodiments wherein the facial orientation detection apparatus 102 comprises a server, network node, or the like, the communication interface 114 may be configured to communicate with a remote user terminal (e.g., the remote terminal 304) to allow the user terminal and/or a user thereof to access face detection and facial orientation functionality provided by the facial orientation detection apparatus 102. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the facial orientation detection apparatus 102 and one or more computing devices are in communication. The communication interface 114 may additionally be in communication with the memory 112, user interface 116, image capture circuitry 118, detection circuitry 120, and/or display lock module, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the facial orientation detection apparatus 102 is embodied as one or more servers, aspects of the user interface 116 may be reduced or the user interface 116 may even be eliminated. The user interface 116 may be in communication with the memory 112, communication interface 114, image capture circuitry 118, detection circuitry 120, and/or display lock module, such as via a bus.

The image capture circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the image capture circuitry 118 is embodied separately from the processor 110, the image capture circuitry 118 may be in communication with the processor 110. The image capture circuitry 118 may further be in communication with one or more of the memory 112, communication interface 114, user interface 116, detection circuitry 120, and/or display lock module, such as via a bus.

The image capture circuitry 118 may comprise hardware configured to capture an image. In this regard, the image capture circuitry 118 may comprise a camera lens and/or other optical components for capturing a digital image. As another example, the image capture circuitry 118 may comprise circuitry, hardware, a computer program product, or some combination thereof that is configured to direct the capture of an image by a separate camera module embodied on or otherwise operatively connected to the face detection apparatus 102. In embodiments wherein the facial orientation detection apparatus 102 is embodied as a mobile terminal 10, the image capture circuitry 118 may comprise the camera circuitry 36. In embodiments wherein the facial orientation detection apparatus 102 is embodied as one or more servers or other network nodes remote from a user terminal configured to provide an image or video to the facial orientation detection apparatus 102 to enable the facial orientation detection apparatus 102 to perform face detection on the image or video, aspects of the image capture circuitry 118 may be reduced or the image capture circuitry 118 may even be eliminated.

The detection circuitry 120 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the detection circuitry 120 is embodied separately from the processor 110, the detection circuitry 120 may be in communication with the processor 110. The detection circuitry 120 may further be in communication with one or more of the memory 112, communication interface 114, user interface 116, or image capture circuitry 118, such as via a bus.

The display lock module 122 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In an example embodiment, the display lock module 122 is configured to activate an inactivity timer (not shown) that is configured to cause a display to lock when there is not any physical input or interaction for a set duration. The duration may be a default or predetermined duration and/or may be set by a user. In other words, the display lock module 122 may lock the display of a device after a certain period and/or duration of inactivity and/or physical interaction. At the expiration of the inactivity timer, the display lock module 122 may provide an indication that the inactivity timer has expired to the processing device (e.g., the processor 110). In another example embodiment, the display lock module 122, may provide an indication to the processing device (e.g., the processor 110) indicating that the display should be locked, in response the processing device (e.g., the processor 110) may cause the display to then be locked.

In response to the display lock module 122 notification, the processing device, such as processor 110, may activate the image capture circuitry 118 to capture an image of the environment surrounding the device. Such an image is captured to determine if a user is currently in the environment surrounding the device and in particular if the user is still paying attention to the device. As described herein, the image capture circuitry 118 may activate a camera and/or the like to capture an image of the local environment. In an example embodiment the camera may comprise the camera circuitry 36 and the camera circuitry 36 may oriented in the same or similar direction as the display (e.g., a front facing camera) so as to capture an image of a user in an instance in which the user is passively interacting with the device, such as when a user is watching a video clip.

Once an image is captured by image capture circuitry 118, the processor may activate detection circuitry 120. In an example embodiment the detection circuitry 120 is configured to detect if a face is present in the captured image. Various facial detection algorithms may be used to determine if a face is present in the captured image. One example method for performing facial detection is found in "Rapid Object Detection using a Boosted Cascade of Simple Features," Paul Viola and Michael Jones, December 2001, which is hereby incorporated by reference as if set forth in its entirety herein. The detection circuitry is further configured to operate facial detection and facial analysis algorithms to determine a user's attention level by detecting the presence and/or the orientation of the captured face.

In an example embodiment, the detection circuitry 120 is further configured to perform facial analysis of a captured image in order to determine the level of user attention. Example methods for performing facial detection and facial analysis are found in "A Generic Framework of a User Attention Model and its Application in Video Summarization," Ma, Yu-Fei et. al. dated October 2005, and "Robust multipose face detection in images" Rong Xiao et. al., January 2004; which are both hereby incorporated by reference as if set forth in its entirety herein. However, other such systems and methods for performing facial may be additionally or alternatively utilized in other embodiments.

In an example embodiment, to determine the level of user attention, the detection circuitry 120 may be configured to analyze facial actions, facial orientation, facial features, gaze and hand gestures and/or the like that are visible in a captured image. The detection circuitry 120 may also be configured to analyze the captured image to determine user attention from the position of the eyes and orientation of the face in the captured image. For example, when a user is looking straight at the device there will likely be two eyes visible in the captured image, whereas when a face is captured in profile there is generally only a portion of a single eye visible. The detection circuitry 120 may further determine a focal point of the eyes in the captured image. The focal point may be used to more precisely determine where a user is looking at the time of the captured image. If the eyes are at least partially directed toward the device, as determined from the focal point of the eyes, then the detection circuitry may determine that the user whose image was captured is still focused, paying attention to, and/or interacting with the device. If the eyes are not directed toward the device, then the detection circuitry 120 may determine that the user is no longer paying attention to the device.

Alternatively or additionally, the detection circuitry 120 may be configured to determine a user attention level based on a user's current interaction with the device, for example, mobile terminal 10. For example, if a user is interacting with a program that is providing driving directions over an audio system the detection circuitry 120 may only require the detection of the user in the image to keep the device, such as mobile terminal 10, from entering a lock and/or sleep mode without requiring the user to be focused on or otherwise paying attention to the device. In this example, the audio driving directions would symbolize a situation where the user would not actually have to be looking at the device for the user to still be paying attention. In another example, if a video clip was being displayed on the mobile device 10, then the detection circuitry may attempt to determine if the user is at least partially looking at the mobile device 10. If the user is present but not looking at the screen then the detection circuitry 120 may lock the device one the timer expires.

Alternatively or additionally, the detection circuitry 120 may adjust its user attention level decision based on the location, within or relative to the device, of the image capture circuitry 118. For example, in an embodiment in which a camera is displaced from the user's focal point on a display screen, the detection circuitry 120 may be configured to provide the processor 110 with a distance between the camera and the focal point so as to facilitate a determination by the processor of whether the user is actually at least partially looking at the display, even if the user is not directly looking at the camera.

Figure 3:
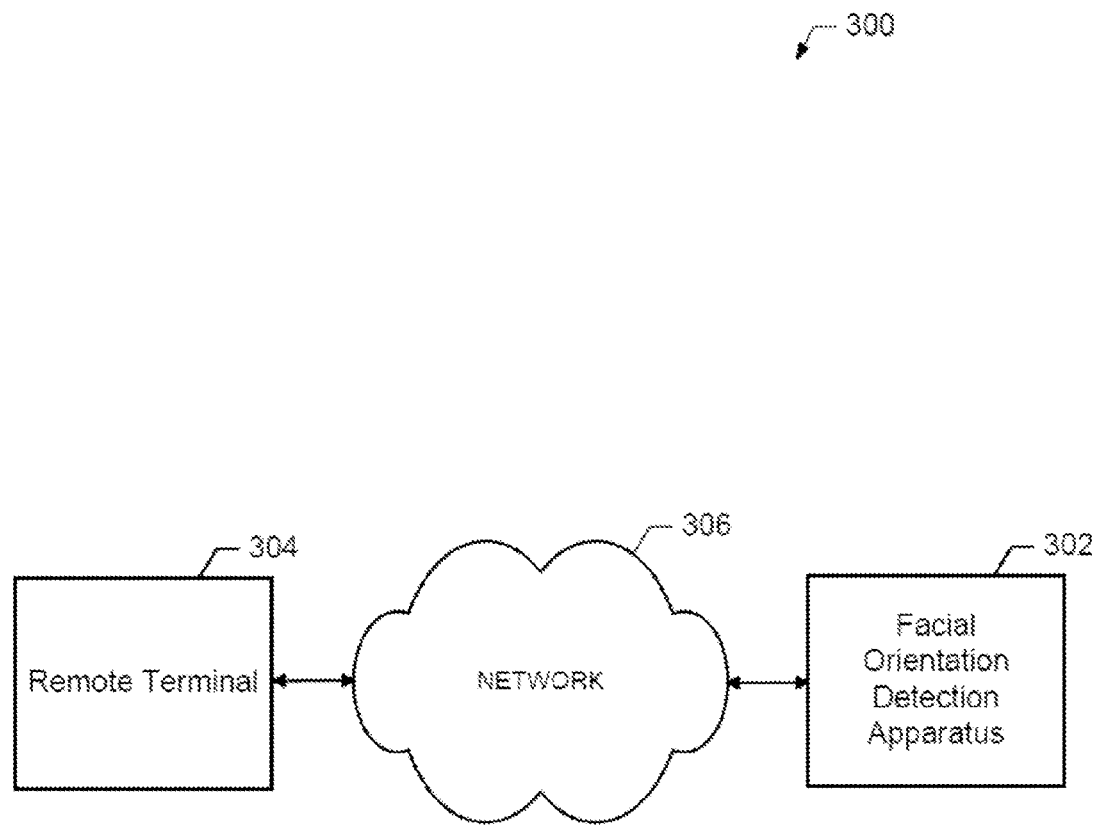
FIG. 3 illustrates a system for performing facial orientation detection according to an example embodiment of the invention.

As described in conjunction with the embodiment of FIG. 1, the user terminal may include the facial orientation detection apparatus 102. However, the facial orientation detection apparatus 102 may also be separated from and in communication with the user terminal. Further, FIG. 3 illustrates a system 300 for performing facial orientation detection according to an example embodiment of the invention. The system 300 comprises a facial orientation detection apparatus 302 and a remote terminal 304 configured to communicate over the network 306. The facial orientation detection apparatus 302 may, for example, comprise an embodiment of the facial orientation detection apparatus 102 wherein the facial orientation detection apparatus 102 is embodied as one or more servers, one or more network nodes, or the like that is configured to provide face detection and facial orientation services to a remote user terminal and/or user thereof. The remote terminal 304 may comprise any user terminal configured to access the network 306 and communicate with the facial orientation detection apparatus 302 in order to access face detection and facial orientation services provided by the facial orientation detection apparatus 302. The remote terminal 304 may, for example, be embodied as a desktop computer, laptop computer, mobile terminal, mobile computer, mobile phone, mobile communication device, mobile terminal 10, game device, digital camera/camcorder, audio/video player, television device, radio receiver, digital video recorder, positioning device, any combination thereof, and/or the like. The network 306 may comprise a wireline network, wireless network (e.g., a cellular network, wireless local area network, wireless wide area network, some combination thereof, or the like), a direct communication link (e.g., Bluetooth, machine-to-machine communication or the like) or a combination thereof, and in one embodiment comprises the internet.

In the example system illustrated in FIG. 3, the facial orientation detection apparatus 302 may be configured to receive an image, video clip, video frame, and/or the like sent by the remote terminal 304. The facial orientation detection apparatus 302 (e.g., detection circuitry 120) may be configured to perform face detection and facial orientation detection on the received image, video clip, and/or video frame in accordance with any of the embodiments described herein below with respect to the face detection apparatus 102. The facial orientation detection apparatus 302 (e.g., detection circuitry 120 and/or communication interface 114) may be further configured to user attention results of facial orientation performed by the facial orientation detection apparatus 302 to the remote terminal 304.

In another example embodiment of the system 300, aspects of the detection circuitry 120 may be distributed between the remote terminal 304 and facial orientation detection apparatus 302. In this example embodiment, the facial orientation detection apparatus 302 may handle some of the processing tasks required for performing face detection. In this regard, the remote terminal 304 may not be required to perform more computationally-intensive steps for performing face detection. In yet another example embodiment of the system 300, the remote terminal 304 and the facial orientation detection apparatus 302 may be embodied by a single device such as is described with respect to FIGS. 1 and 2.

Figure 4:
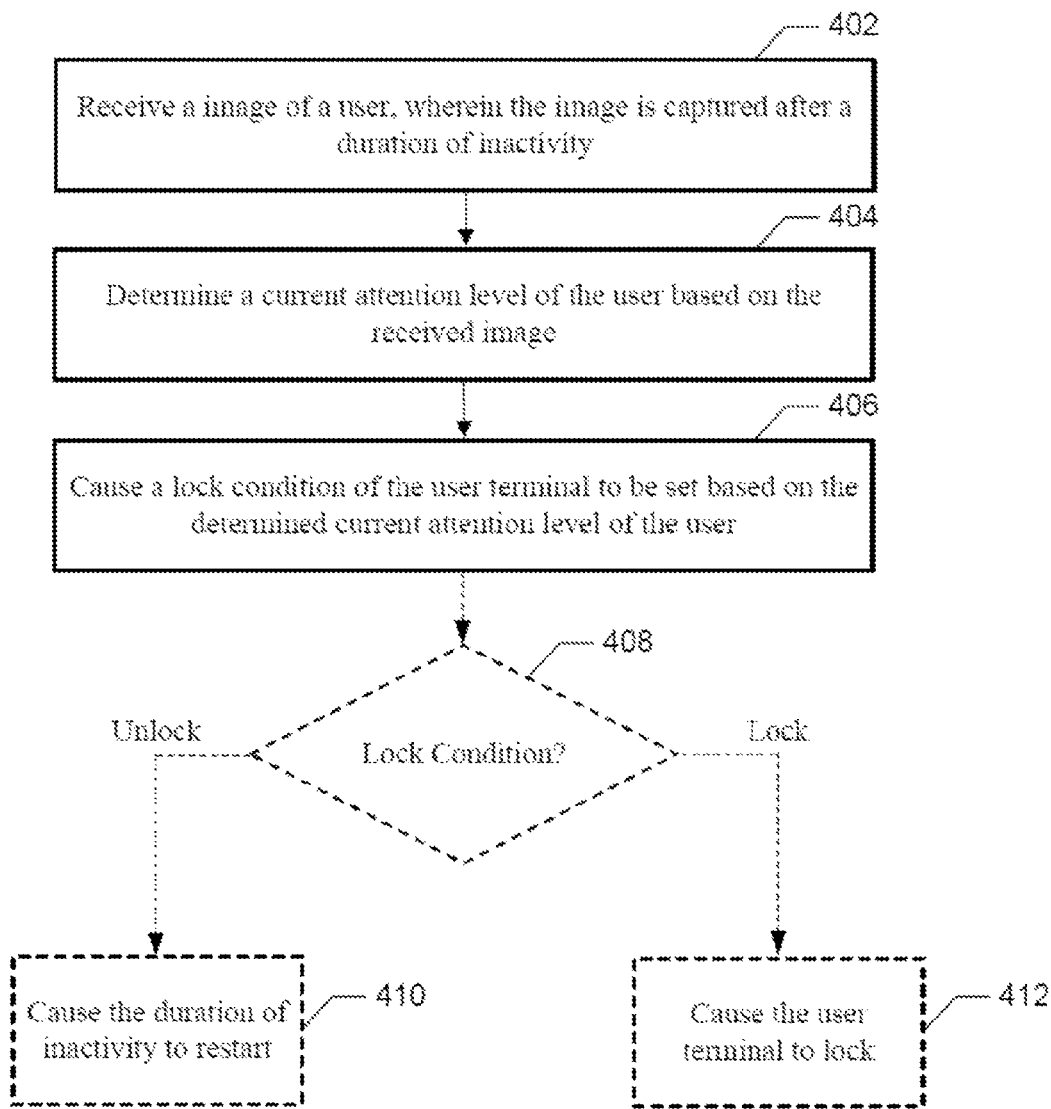
FIG. 4 illustrates a flowchart according to an example method for performing face detection according to an example embodiment of the invention.

FIG. 4 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by a computer program product including computer program instructions stored in a non-transitory computer-readable storage device. In this regard, the computer program instructions which embody the procedures described above may be stored by a memory device of the mobile terminal or network device and executed by a processor in the mobile terminal 10 or network device. As will be appreciated, any such computer program instructions may be loaded onto a computer or other programmable apparatus (e.g., hardware) to produce a machine, such that the resulting computer or other programmable apparatus embody means for implementing the functions specified in the flowcharts' blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts' blocks. The computer program instructions may also be loaded onto a computer or other programmable apparatus to cause a series of operations to be performed on the computer or other programmable apparatus to produce a computer-implemented process.

Accordingly, blocks of the flowchart support combinations of means for performing the specified functions and/or program instructions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, FIG. 4 illustrates a flowchart according to an example method for performing face detection. At block 402 an image of a user is received in conjunction with the expiration of an inactivity timer, such as by the processor 110 of the apparatus 102. For example, once an inactivity timer has expired, an image of the environment surrounding the device is captured, such as by the image capture circuitry 118. In an example embodiment, the image is captured and analyzed by the apparatus 102 prior to the user terminal locking or entering a sleep mode.

At block 404, a current attention level of the user is determined, such as by the processor 110 and the detection circuitry 120, based on the received image. As described above, the processor 110 in conjunction with the detection circuitry 120, is configured to determine a current level of user attention. For example, if a user is at least partially looking towards the device in the image, then it is likely that the user is still paying attention to the device. If the user is not at least partially looking towards the device in the image and the device is currently executing a program that would generally require a user to be directed or focused towards the device, then the user may no longer be paying attention and the device may lock its display. Finally, if a user is not detected in the image, then it will be assumed, in example embodiments, that the user is no longer paying attention and the device may lock its display.

At block 406, a lock condition of the computing device is set, such as by the processor 110, based on the determined current attention level of the user when the inactivity timer has expired. As described herein, the processing device, such as the processor 110, is configured to determine the current attention level of the user. For example, the processor 110 may set a lock condition to unlock when the determined orientation of the face detected is at least partially directed to a display of the computing device. In yet another example, the processor 110 may set a lock condition to lock when the determined orientation of the face detected is not directed to a display of the computing device or a face is not detected in a captured image and/or image. The lock condition acts as a signal to the display lock module 122 to lock the display or reset the inactivity timer of the device, such as mobile device 10. The method ends at the conclusion of block 406.

Although shown in the flowcharts in a somewhat abbreviated manners, certain ones of the operations above may be modified or further amplified as described below. Moreover, in some embodiments additional optional operations may also be included (some examples of which are shown in dashed lines in FIG. 4). It should be appreciated that each of the modifications, optional additions or amplifications below may be included with the operations above either alone or in combination with any others among the features described herein.

At decision block 408, a lock condition (lock condition set with reference to block 406) is determined, such as by the processor 110. In an instance where the lock condition is set to unlock, then at block 410 the inactivity timer is restarted, such as by the processor 110. Whereas, in an instance where the lock condition is set to lock, then, at block 412, the user terminal is locked and/or enters a sleep mode, such as by the processor 110.

In an example embodiment, an apparatus for performing the method of FIG. 4 and other methods described above may comprise a processor (for example, the processor 70 and/or processor 110) configured to perform some or each of the operations (402-412) described above. The processor may, for example, be configured to perform the operations (402-412) by performing hardware implemented logical functions, executing stored instructions, or executing algorithms for performing each of the operations. Alternatively, the apparatus may comprise means for performing each of the operations described above. In this regard and as described in more detail below, according to an example embodiment, examples of means for performing operations (402-412) may comprise, for example, the processor 110, the memory 112, the communication interface 114, the user interface 116, the image capture circuitry 118, the detection circuitry 120 and/or the display lock module 122, as described above. However, the above-described portions of the apparatus 102 and the mobile terminal 10 as they relate to the operations of the method illustrated in FIG. 4 is merely an example, and it should be understood that various other embodiments may be possible.

In one embodiment, the operation 402 of receiving an image of a user may be conducted by means, such as by the processor 110. Additionally, the operation 404 of determining the current user attention level may be conducted by means, such as by the processor 110 and/or the detection circuitry 120. Also, the operation 406 of causing a lock condition may be conducted by means, such as by the processor 110.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

I claim:

1. A method comprising:
receiving an image of a user, wherein the image is captured after an expiration of an inactivity timer;
determining, using a processor, a current attention level of the user based on the received image, wherein the current attention level is based on the user's current interaction with a program executing on a user terminal when the inactivity timer expires; and
causing a lock condition of the user terminal to be set based on the determined current attention level of the user in the received image and whether the program requires user interaction.

2. The method of claim 1 wherein determining a current attention level of the user based on the received image further comprises detecting a presence of a face within the received image; and determining an orientation of the face detected within the image.

3. The method of claim 2 wherein causing a lock condition of the computing device to be set further comprises setting a lock condition to unlock in an instance in which the orientation of the face detected is at least partially oriented toward a display of the user terminal.

4. The method of claim 2 wherein causing a lock condition of the computing device to be set further comprises causing a lock condition to be set to lock in an instance in which the orientation of the face detected is not oriented toward a display of the user terminal.

5. The method of claim 1 further comprising:
causing the user terminal to lock a display of the user terminal when the lock condition is set to lock; and
causing the user terminal to restart the inactivity timer when the lock condition is set to unlock.

6. The method of claim 1 further comprising causing a front facing camera to be activated on user terminal when the inactivity timer expires.

7. The method of claim 6 further comprising determining a face at least partially oriented toward a display of the user terminal is based upon at least a determined distance between the front facing camera and a focal point of the user.

8. An apparatus comprising at least one processor and at least one memory including computer program code, the at least one memory and the computer program code configured to, with the processor, cause the apparatus to:
receive an image of a user, wherein the image is captured after a duration of inactivity;
determine a current attention level of the user based on the received image, wherein the current attention level is based on the user's current interaction with a program executing on a user terminal when an inactivity timer expires; and
cause a lock condition of the user terminal to be set based on the determined current attention level of the user in the received image and whether the program requires user interaction.

9. The apparatus of claim 8 wherein the determined current attention level of the user based on the received image is further configured to detect a presence of facial features within the received image; and determine an orientation of a face based on the presence of facial features detected within the image.

10. The apparatus of claim 9 wherein the processor is further configured to cause a lock condition to be set to unlock when the determined orientation of the face is at least partially directed to a display.

11. The apparatus of claim 9 wherein the processor is further configured to cause a lock condition to be set to lock when the determined orientation of the face is not directed to the display.

12. The apparatus of claim 8 further comprising an inactivity timer that is configured to cause the apparatus to lock after the duration of inactivity.

13. The apparatus of claim 12 wherein the processor is further configured to:
cause the display to be locked when the lock condition of the lock condition is set to lock; and
cause the duration of inactivity to restart when the lock condition of the lock condition is set to unlock.

14. The apparatus of claim 8 further comprising image capture circuitry that is configured to capture the image using a front facing camera on the computing device.

15. The apparatus of claim 8 further comprising detection circuitry that is configured to detect a user attention level in the image.

16. A computer program product comprising at least one computer readable non-transitory memory medium having program code stored thereon, the program code which when executed by an apparatus cause the apparatus at least to:
cause an image to be captured of a user, wherein the image is caused to be captured after a duration of inactivity with the apparatus;
determine a current attention level of the user based on the received image, wherein the current attention level is based on the user's current interaction with a program executing on a user terminal when an inactivity timer expires; and
cause a lock condition of the user terminal to be set based on the determined current attention level of the user in the captured image and whether the program requires user interaction.

17. The computer program product of claim 16 further comprising program code instructions to detecting a presence of a face within the received image; and determining an orientation of the face detected within the image.

18. The computer program product of claim 17 further comprising program code instructions to cause a lock condition of the apparatus to be set to unlock when the determined orientation of the face detected is at least partially directed toward a display of the apparatus.

19. The computer program product of claim 17 further comprising program code instructions to cause a lock condition of the apparatus to be set to lock when the determined orientation of the face detected is not directed toward a display of the apparatus.

20. The computer program product of claim 16 wherein the duration of inactivity is based on an inactivity timer of the apparatus that is configured to cause the computing device to lock after the duration of inactivity.

* * * * *